(12) United States Patent
Cox (10) Patent No.: US 6,215,065 B1
(45) Date of Patent: Apr. 10, 2001

(54) BULKHEAD PENETRATION SYSTEM (75) Inventor: Albert R. Cox, Orland Park, IL (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/286,077

(22) Filed: Apr. 5, 1999

(51) Int. Cl.$^7$ .................................................. H02G 3/18
(52) U.S. Cl. ............................................................ 174/65 R
(58) Field of Search ............................ 174/65 R, 65 SS; 248/56

(56) References Cited

U.S. PATENT DOCUMENTS

| | | | |
|---|---|---|---|
| 2,674,470 | * | 4/1954 | Appleton ........................ 174/65 R X |
| 4,012,578 | * | 3/1977 | Moran et al. ................... 174/65 R X |
| 4,249,353 | | 2/1981 | Berry . |
| 4,256,920 | * | 3/1981 | Ayres et al. ......................... 174/65 R |
| 4,553,812 | | 11/1985 | Kojiro et al. . |
| 4,880,387 | * | 11/1989 | Stikeleather et al. .......... 174/65 R X |
| 5,068,496 | * | 11/1991 | Favalora .............................. 174/65 R |
| 5,132,493 | * | 7/1992 | Sheehan ............................. 174/65 R |
| 5,155,795 | | 10/1992 | Wasserman et al. . |
| 5,170,017 | | 12/1992 | Stanevich et al. . |
| 5,189,258 | * | 2/1993 | Pratesi ................................ 174/65 R |
| 5,200,575 | * | 4/1993 | Sheehan ............................. 174/65 R |
| 5,285,013 | * | 2/1994 | Schnell et al. ...................... 174/65 R |
| 5,373,106 | * | 12/1994 | O'Neil et al. ....................... 174/65 R |
| 5,588,086 | | 12/1996 | Fan . |
| 5,608,189 | * | 3/1997 | Winterhoff et al. ............. 174/65 SS |
| 5,644,673 | | 7/1997 | Patterson . |

\* cited by examiner

*Primary Examiner*—Dean A. Reichard
(74) *Attorney, Agent, or Firm*—Stephen G. Rudisill; Jenkens & Gilchrist (57) ABSTRACT

A bulkhead penetration system for interlocking with a wall to feed cable therethrough is set forth. The system includes a bulkhead member having a shoulder disposed between a collar portion and a locking portion. A plurality of flexible outwardly extending fingers are formed about the locking portion with each finger having a fixed end and a retaining end. The bulkhead member interlocks with the wall such that the wall is retained between at least one of the retaining ends and the shoulder. The distances between retaining ends and the shoulder can vary such that a single system will generally interlock with walls of different thicknesses. The system further includes a boot defining a boot split and a boot bore. The boot includes an inner surface, a first sleeve portion sized to encompass the collar portion, and a second sleeve portion. A grommet defining at least one cable aperture is adapted for being received within the boot bore. Two fasteners for applying force are positioned on the boot to close the boot split and engage the system components. A gasket is removably disposed between the shoulder and retaining ends for providing a tight-fit against the wall. A method for penetrating a wall using a bulkhead penetration system that allows at least one cable to be fed through the wall is also set forth.

99 Claims, 3 Drawing Sheets

BULKHEAD PENETRATION SYSTEM

FIELD OF THE INVENTION

The present invention relates generally to cable systems and, in particular, to a bulkhead penetration system for passing a cable through a wall or bulkhead.

BACKGROUND OF THE INVENTION

The global mobile communications industry is driving the need for improved cable entry devices for passing coaxial transmission line cable through planar obstacles. Effective bulkhead penetration is required at cellular ground base stations where installation usually requires feeding coaxial cable into a building or radio cabinet. However, the predominate cable entry devices now in use in wireless communications base stations generally perform poorly, are limited in their versatility, and are too expensive.

One important consideration for effective bulkhead penetration is to prevent moisture or other environmental elements from passing across the bulkhead. Moisture can migrate across the bulkhead at the boundary where the bulkhead meets the cable entry device, between device components, and at the interface of the cable and cable entry device. Various forces such as wind loading or shaking forces may occur in out-of-doors stations and give rise to vibrations which tend to loosen the cable entry device components and result in compromised leak resistance. For this reason, it is desirable for the cable entry device to provide a lasting leak-tight fit under all types of environmental conditions.

Another consideration is to provide a single cable entry device that is compatible with a variety of wall or bulkhead thicknesses. Frequently, bulkheads of various thicknesses are encountered during base station installation. For example, the cable entry device may be used with cabinet walls, shelter entry plates, roof and wall plates, grounding plates, and other similar thin-walled planar obstacles that a transmission line, cable, waveguide, or other member might need to penetrate. Installation is frustrated when some cable entry devices are unsuited for use with a particular bulkhead thickness. Since storing and/or stocking many different devices for use in various situations is uneconomical, it is desirable that the same cable entry device be compatible and function properly with a variety of bulkhead thicknesses.

Furthermore, increased ease of installation is desired especially since some cable entry devices are installed in very awkward locations. These circumstances, for example, include limited intimate access to one side of the bulkhead. Installation is further complicated by prior art devices having a multitude of component parts. For example, some prior art devices require a secondary mounting plate which is attached to the bulkhead with screws, nuts, and sealing compound. These devices require the installer to control many parts at the same time and sometimes necessitate the assistance of another worker.

Hence, in addition to accommodating multiple cables or members, multiple shaped members, or a combination of either, what is needed is a bulkhead penetrator which is leak tight, simple to install, compatible with a variety of bulkhead thicknesses, and economical to manufacture and distribute.

SUMMARY OF THE INVENTION

The present invention is a bulkhead penetration system for interlocking with a wall to feed a cable therethrough. The system includes a bulkhead member defining a bore therethrough and formed about a longitudinal axis. The bulkhead member has an outwardly extending shoulder disposed between a locking portion and a collar portion. The locking portion has a plurality of outwardly extending locking fingers, each having a fixed end and a retaining end with a camming surface disposed therebetween. The retaining end is proximate to the shoulder relative to the fixed end and each of the locking fingers defines a finger length between the fixed end and the retaining end. The locking fingers are capable of deflecting independently of each other and each retaining end is raised relative to the fixed end when the locking finger is in a substantially undeflected position. Each of said locking fingers in the undeflected position define an angle between the finger length and the longitudinal axis. The bulkhead member interlocks with the wall such that the wall is retained between at least one of the retaining ends and the shoulder.

The bulkhead penetration system further includes a boot made of resilient material defining a boot split and a boot bore along the longitudinal axis such that the boot has a substantially C-shaped cross-section. The boot has a first sleeve portion integral with a second sleeve portion. The first sleeve portion is sized for encompassing the collar portion. The boot has a first and a second sealing surface at the boot split extending along the longitudinal axis. The first sealing surface engages the second sealing surface when the boot split is joined at the longitudinal axis L.

Furthermore, the bulkhead penetration system includes a sealing grommet defining therein at least one cable aperture for receiving a cable. The grommet is sized and shaped to generally conform with the inner surface of the boot bore. A gasket is optionally disposed between the shoulder and all of the retaining ends for sealing engagement of the shoulder with the wall. Also, a first and second fastener are placed on the first and second sleeve portions, respectively, to close the boot split.

Another aspect of the invention provides a method for penetrating a wall using a bulkhead penetration system that allows at least one cable to be fed through the wall. The method includes the step of forming a hole in the wall having a size slightly larger than the bulkhead member. Next, a cable is passed through a bore defined within a bulkhead member and through the hole. The bulkhead member is pressed into the hole generally along the longitudinal axis and substantially perpendicular to the wall such that the wall contacts at least one of the camming surfaces and such that at least one of the locking finger in contact with the wall deflects from the undeflected position. Then, the bulkhead member is locked into position such that at least one of the locking fingers returns to the substantially raised position to provide a detent for the wall such that the wall is retained between at least one of the retaining ends and the shoulder.

BRIEF DESCRIPTION OF THE DRAWINGS

Other objects and advantages of the invention will become apparent upon reading the following detailed description and upon reference to the drawings in which.

While the invention is susceptible to various modifications and alternative forms, a specific embodiment thereof has been shown by way of example in the drawings and will herein be described in detail. It should be understood, however, that it is not intended to limit the invention to the particular forms disclosed. Quite to the contrary, the intention is to cover all modifications, equivalents, and alternatives falling within the spirit and scope of the invention as defined by the appended claims.

DESCRIPTION OF ILLUSTRATIVE EMBODIMENTS

Figure 1:
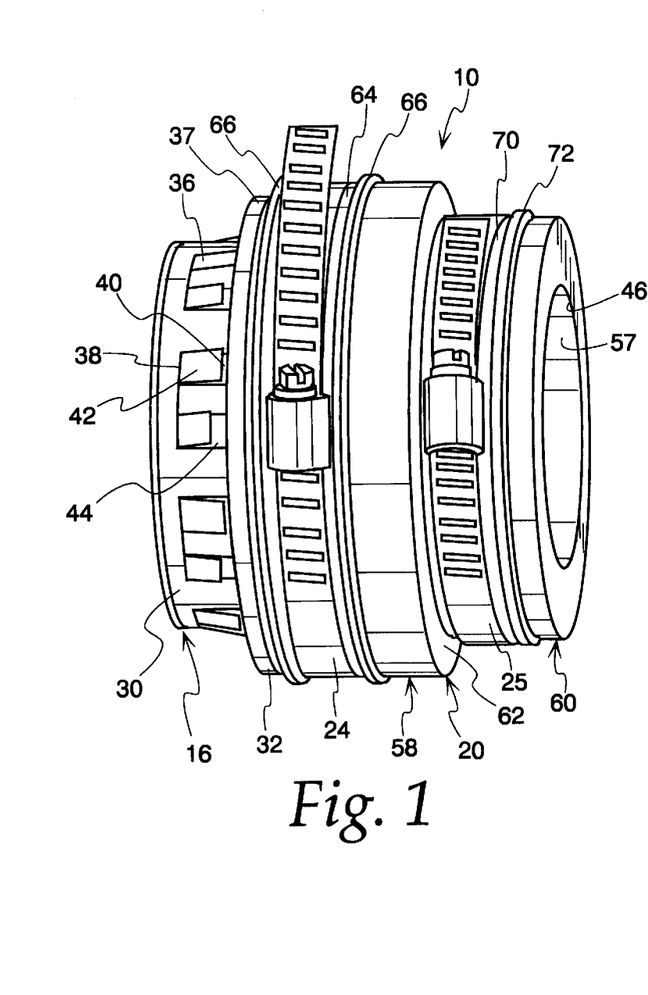
FIG. 1 is a perspective view illustrating a bulkhead penetration assembly in accordance with the invention.
Figure 2:
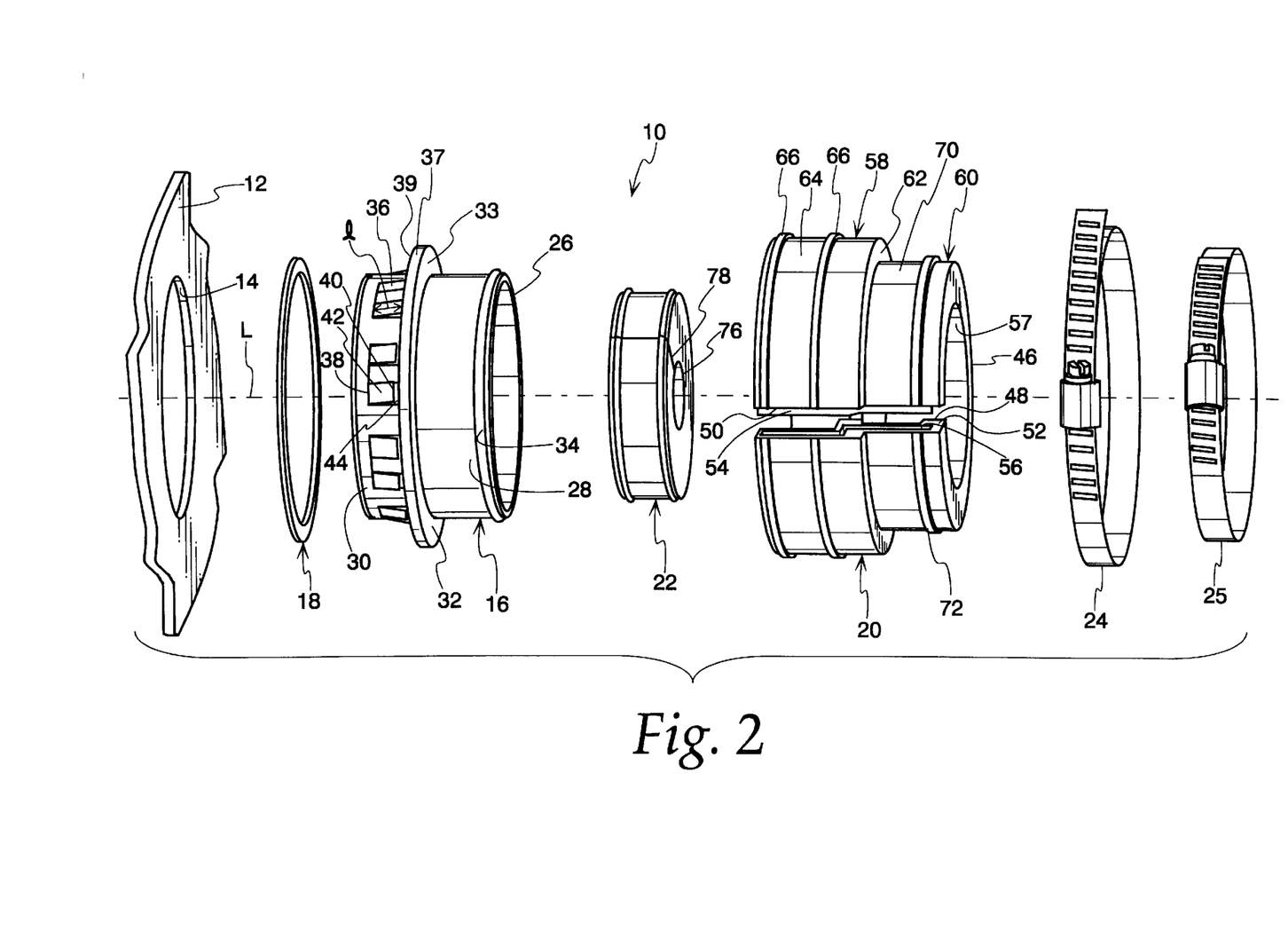
FIG. 2 is an exploded perspective view illustrating a wall and the bulkhead penetration assembly in accordance with the invention.
Figure 3:
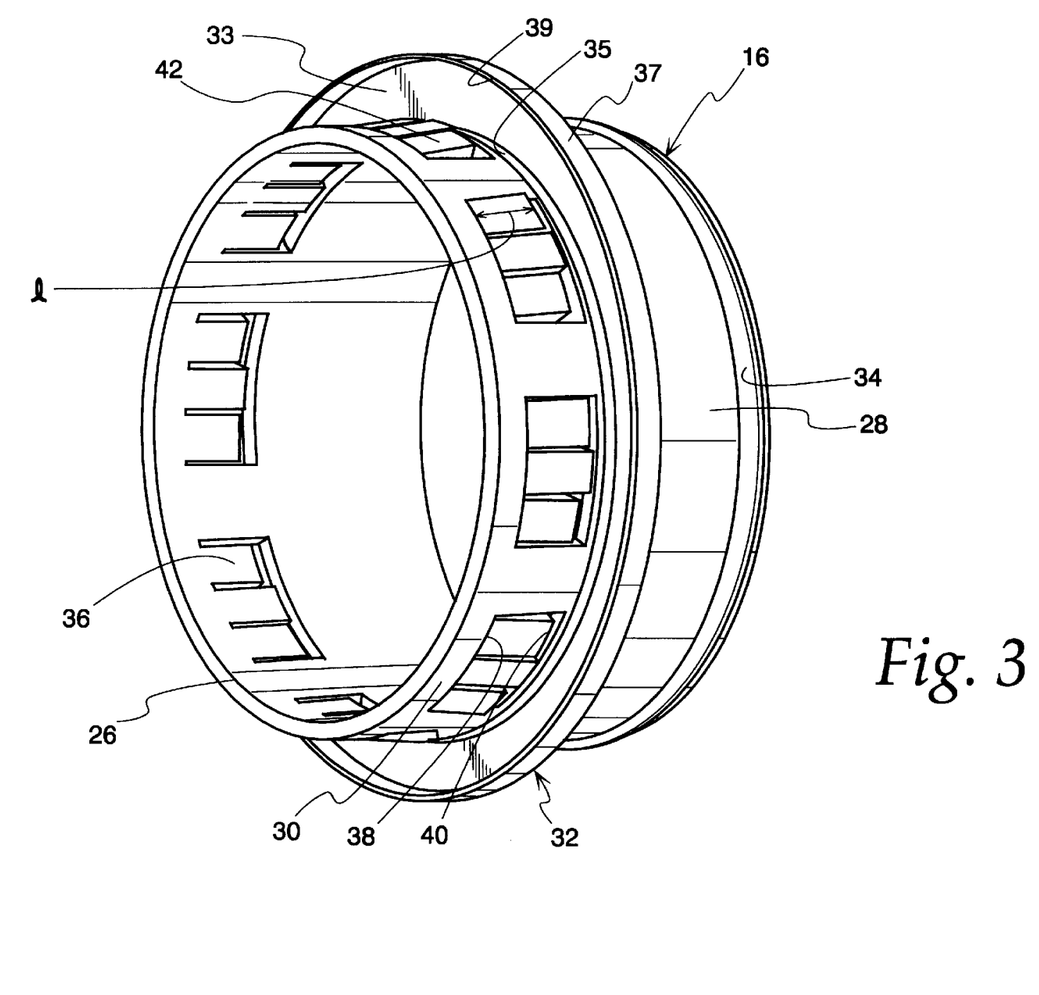
FIG. 3 is a perspective view illustrating a bulkhead member in accordance with the invention.
Figure 4:
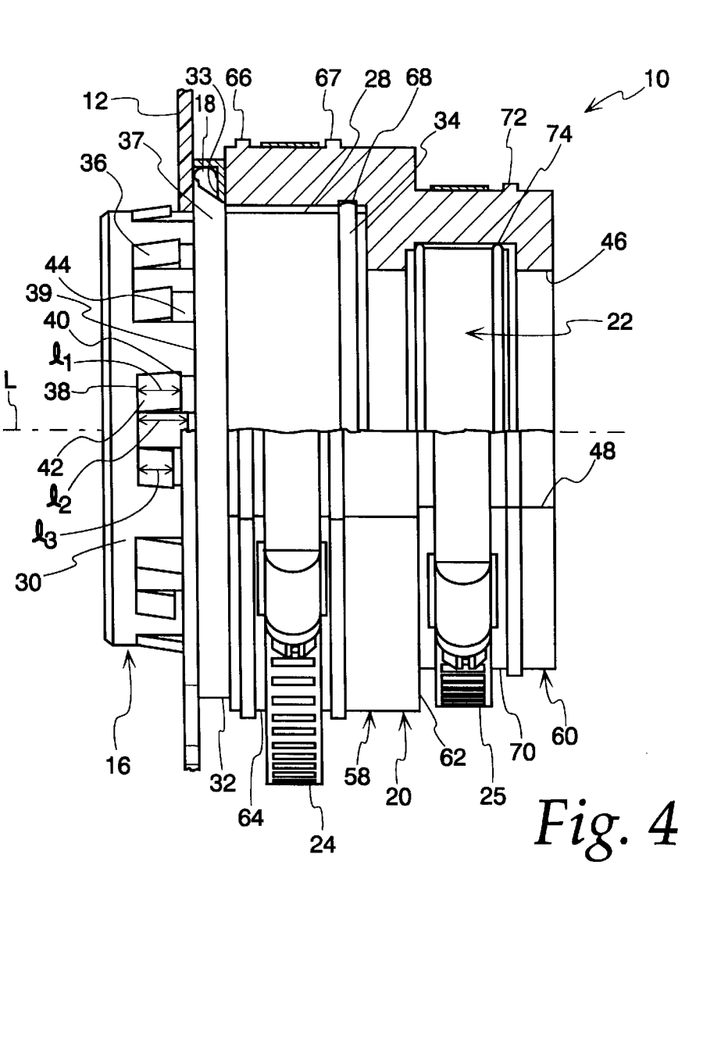
FIG. 4 is a side view, partially in section, further illustrating the bulkhead penetration assembly in accordance with the invention.

Referring now to FIGS. 1–4, a bulkhead penetration system 10 in accordance with the invention is shown. In addition to the bulkhead penetration system being formed about a longitudinal axis L, FIGS. 2 and 4 show a wall or bulkhead 12 defining a pre-cut hole 14. As illustrated, the bulkhead penetration system 10 allows a cable to be fed through a wall. The system 10 includes a snap-in bulkhead member 16, a gasket 18, a split boot 20, a grommet 22, and two fasteners 24 and 25.

The bulkhead member 16 can be made of materials such as metal, thermoset, or thermoplastic material by methods including machining, molding, stamping, or the like. As shown, the bulkhead penetration system 10 is preferably generally cylindrical and defines a generally cylindrical bore 26. However, the bulkhead member 16 or bore 26, as well as other system components, can be of any shape.

The bulkhead member 16 includes a collar portion 28, a locking portion 30, and a shoulder 32. As in FIG. 3, the shoulder 32 includes an outwardly extending flange portion 33 intersecting with the locking portion 30 at a reinforcing rib 35. The shoulder 32 further includes a skirt portion 37 extending from and generally orthogonal to the flange portion 33. The skirt portion 37 is substantially cylindrical and includes a contacting edge 39. The gasket 18 can be removably positioned against the flange portion 33 between the locking portion 30 and skirt portion 37 for a leak-tight fit.

The collar portion 28 includes a retaining rib 34 for engaging the split boot 20. The locking portion 30 includes a plurality of concentrically arranged, integrally formed locking fingers 36, each having a fixed end 38 and a retaining end 40 with a camming surface 42 disposed therebetween. Each locking finger 36 defines a finger length l between the fixed end 38 and the retaining end 40. In a substantially undeflected position, each locking finger 36 extends outwardly at an angle with respect to the longitudinal axis L such that each locking finger 36 slopes outwardly from the fixed end 38 towards the retaining end 40. Each locking finger 36 is capable of deflecting independently of each other generally due to the resiliency of the material and a gap 44 along the longitudinal axis L which is defined between the flange portion 33 and each of the retaining ends 40 for receiving the bulkhead 12.

The locking fingers 36 are designed to provide a snap-fit engagement with the bulkhead 12. The bulkhead 12 is pre-cut with a properly sized hole 14 such that when the locking portion 30 is pressed into the pre-cut hole 14 generally along the longitudinal axis L and substantially perpendicular to the bulkhead 12, the bulkhead 12 contacts at least one of the camming surfaces 42. As the bulkhead member 16 is pressed through the bulkhead, the locking fingers 36 engaging the bulkhead 12 deflect radially inward allowing the locking portion 30 to continue penetrating the bulkhead 12. As the bulkhead member 16 further penetrates the bulkhead 12, the bulkhead 12 contacts the contacting edge 39. The shoulder 32 is capable of flexing generally about the reinforcing rib 35 to accommodate the bulkhead 12 until the bulkhead 12 snaps into position between the locking fingers 36 and shoulder 32. The flexed shoulder 32 provides a force against the bulkhead 12 helping to securely lock the bulkhead 12 in place. Those locking fingers 36 whose retaining ends 40 have cleared the bulkhead 12 generally return to their substantially raised position to provide a detent for the bulkhead 12, locking the bulkhead member 16, and the entire bulkhead penetration system 10, firmly into position. The system 10 can be removed from the bulkhead 12 by depressing the raised locking fingers 36 and pushing the bulkhead member 16 back out of the pre-cut hole 14.

The thickness of the bulkhead 12 with which the system 10 will successfully interlock generally depends upon the gap 44 between the retaining ends 40 and the flange portion 33. The length of the gap 44 varies with the degree of flexure of the shoulder 32. For example, a flexible shoulder 32 allows for a larger gap 44 to accommodate a thicker bulkhead 12 as compared with a rigid shoulder 32. The width of the skirt portion 37 may vary as well In one embodiment, the length of the skirt 37 is substantially equal to the thickness of the gasket 18 such that the gasket 18 contacts the bulkhead 12. In another embodiment, the skirt portion 37 is excluded.

Accommodating bulkheads 12 of different thicknesses is also achieved by varying the position of the retaining ends 40 on the locking portion 30 along the longitudinal axis L. For example, a retaining end 40 located at a greater distance from the flange portion 33 will generally provide a larger gap 44 for receiving a bulkhead 12 having a greater thickness. Also, the width of the gap 44 may also be varied by changing the finger length l and/or the position of the fixed end 38. For example, a fixed end 38 positioned further away from the flange portion 33 given a fixed finger length will result in a larger gap 44. Also, with the fixed end 38 in the same position, a shorter finger length l will provide a wider gap 44 between a finger's retaining end 40 and the contacting edge 39 (or gasket 18) and thereby accommodate a thicker bulkhead 12 within the gap 44. Similarly with the fixed end 38 in the same position, a longer finger length l will result in a narrower gap 44 between the finger's retaining end 40 and the flange portion 33, and thereby only accommodate a thinner bulkhead 12.

It is possible for all of the locking fingers 36 to have their retaining ends 40 generally equidistant from the flange portion 33 such that the gap 44 between each locking finger 36 and flange portion 33 is the same around the locking portion 30 when the shoulder 32 is not flexed. Flexure of the shoulder 32 allows for accommodating slightly thicker bulkheads 12. However, it is advantageous for at least one subset of locking fingers 36 to have their retaining ends 40 generally at a first distance from the shoulder 32 and to have the distance of the retaining ends 36 from the flange portion 33 vary from one subset to the next in order to allow a single bulkhead penetration system 10 to be used with bulkheads of substantially different thicknesses. As shown in FIG. 4, the bulkhead member 16 is provided with locking fingers 36 having three different finger lengths $l_1$, $l_2$, and $l_3$ grouped in a concentric arrangement around the locking portion 30 and all of the fixed ends 38 substantially equidistant from the flange portion 33. Such an arrangement generally provides for three subsets of locking fingers 36 having retaining ends 40 equidistant from the flange portion 33 such that the distance between the flange portion 33 and retaining ends 36 is different for each subset enabling the bulkhead member 16 to interlock with bulkheads 12 generally of three different thicknesses. All of the locking fingers 36 of each subset are preferably substantially evenly distributed around the locking portion 30 to provide a uniform detent for the bulkhead 12 along the entire perimeter of the pre-cut hole 14.

Generally, as the bulkhead member 16 is pressed into the pre-cut hole 14, only those locking fingers 36 that provide a gap 44 that is larger than the thickness of the bulkhead 12 will snap back into their undeflected positions and provide a detent for the bulkhead 12. Longer locking fingers 36 will remain depressed between the bulkhead 12 and locking portion. For example, if the bulkhead penetration system 10 is used with a bulkhead 12 thinner than the gap 44 between the flange portion 33 and the retaining end 40 of the longest locking fingers 36 such that all of the locking fingers 36 snap back into their substantially undeflected positions after being pressed through the hole 14, then the longest locking fingers 36 will serve as the primary detent for the bulkhead 12 and, if the longest locking fingers 36 fail for some reason, shorter locking fingers 36 are available for maintaining the system 10 in position. The flexure of the shoulder 32 together with the slight compression of the gasket 18 provide further adjustment corresponding to the thickness of the bulkhead 12. Such versatility with various bulkhead thicknesses make the system 10 easier and more economical to use than prior bulkhead penetration systems.

To help ensure that a sufficient detent will be provided in the event the hole 14 is larger as a result of not being pre-cut accurately, the angle of the locking fingers 36 with respect to the longitudinal axis can vary. A locking finger 36 with a greater angle will generally provide more resistance when it is being pressed through the hole 14, and be subject to a greater bending moment about the fixed end 38, when it is subject to forces tending to pull the system 10 out of the hole 14. As a result of increased bending stresses, chances for material failure of the locking finger 36 at the fixed end 38 are increased. For these reasons, the angle of shorter locking fingers 36 is preferably greater than the angle of longer locking fingers 36.

FIGS. 1, 2 and 4 also illustrate the boot 20 which can be made of materials such as metal, thermoset, or thermoplastic material by methods such as machining, molding, stamping, or other means such that the boot 20 is capable of flexing. The boot 20 defines a boot bore 46 and a boot split 48 along the longitudinal axis L. While the boot 20 preferably has a substantially C-shaped cross-section, it can be of any shape. At the boot split 48, the boot 20 includes first and second sealing surfaces 50 and 52. To help eliminate moisture ingress, the first sealing surface 50 includes a tongue 54 for mating with a groove 56 of the second sealing surface 52 when the boot split 48 is joined at the longitudinal axis L.

The boot 20 also includes an inner surface 57, a first sleeve portion 58 integral with a second sleeve portion 60, and a step 62. Preferably, the first sleeve portion 58 is radially larger than the second sleeve portion 60 to encompass the collar portion 28 of the bulkhead member 16. The first sleeve portion 58 includes a first channel 64 that is defined by two raised ribs 66 and 67 for positioning a first banding clamp or other similar fastener 24. As illustrated in FIG. 4, at the inner surface 57 of the first sleeve portion 58, a groove 68 is formed for receiving the retaining rib 34 of the bulkhead member 16. The second sleeve portion 60 includes a second channel 70 that is defined between the step 62 and a raised rib 72 for positioning a second banding clamp or other similar fastener 25. At the inner surface 57 of the second sleeve portion 60, a recess 74 is formed for receiving the sealing grommet 22, as illustrated in FIG. 4.

Focusing now on FIG. 2, in one embodiment, the sealing grommet 22 is made of a thermoset, or thermoplastic material. The grommet 22 defines at least one pre-formed cable aperture 76, and at least one grommet split 78 extending radially from the longitudinal axis L and intersecting with the cable aperture 76 for allowing a cable to be more easily inserted into the cable aperture 76. The cable aperture 76 can be of any shape or size to conform with the desired shape and size of the cable to be passed therethrough. Also, the grommet 22 may have multiple apertures 76 of one or more sizes and/or geometries to accommodate multiple cables. While the grommet 22 is shown to be a circular disc having a thickness, the grommet 22 can be of any shape complementary with the shape of the boot bore 46 and adapted to seal against the inner surface 57.

With particular reference to FIGS. 2 and 4, the bulkhead penetration system 10 is shown assembled and connected to the bulkhead 12. The bulkhead penetration system 10 is generally assembled by positioning the gasket 18 against the flange portion 33 between the skirt portion 37 and the locking portion 30 either at the site of installation or in advance by the manufacturer. The bulkhead member 16 is then pressed into a pre-cut hole 14 of the bulkhead 12 until the system 10 locks into a firm sealing engagement with the bulkhead 12. A cable is inserted into the pre-formed cable aperture 76 of the grommet 22, into the boot bore 46, and further through the bore 26 of the bulkhead member 16, and through the pre-cut hole 14. Next, the grommet 22 is positioned within the boot recess 74. Then, the collar portion 28 of the bulkhead member 16 is inserted into the first sleeve portion 58 until the retaining rib 34 is positioned within the groove 68 and the shoulder 32 abuts the boot 20. A first fastener 24 is positioned within the first channel 64 of the boot 20 and a second fastener 25 is positioned within the second channel 70 of the boot 20. Both fasteners 24 and 25 must be positioned with the tightening mechanism positioned adjacent to the boot split 48 in such a manner that the tightening action pulls normal to the split 48 and pulls the split together as the clamping action compresses the seal and seals the components of the system 10.

While the embodiments of the invention illustrated herein are shown in connection with a bulkhead penetration system 10 for use with coaxial transmission line cables having circular cross-sections, the invention may find other applications as well. For example, the bulkhead penetration system 10 may be used with various other types of individual or multiple cables or wires having non-circular cross-sections and in various bulkhead applications not limited to the wireless telecommunications industry.

Each of these embodiments and obvious variations thereof are contemplated as falling within the spirit of the claimed invention, which is set forth in the following claims.

What is claimed is:

1. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary.

2. The bulkhead penetration system of claim 1, wherein said fixed ends of said locking fingers are substantially equidistant from said shoulder.

3. The bulkhead penetration system of claim 1, wherein said finger lengths of said locking fingers are substantially equal.

4. The bulkhead penetration system of claim 1, wherein said angle of a locking finger with a shorter finger length is larger relative to an angle of said locking finger with a longer finger length.

5. The bulkhead penetration system of claim 1, wherein said angles are substantially equal.

6. The bulkhead penetration system of claim 1, wherein said bore is substantially cylindrical.

7. The bulkhead penetration system of claim 1, wherein said angles of said locking fingers are substantially equal.

8. The bulkhead penetration system of claim 1 further including a gasket disposed between said retaining ends and said shoulder for sealing engagement between said shoulder and said wall.

9. The bulkhead penetration system of claim 1, wherein said plurality of locking fingers includes at least two subsets of said locking fingers, each subset having at least two locking fingers wherein said retaining ends of each subset are located a substantially equal distance from said shoulder, said distance being different for each said subset.

10. The bulkhead penetration system of claim 9, wherein said fixed ends of said locking fingers are substantially equidistant from said shoulder.

11. The bulkhead penetration system of claim 9, wherein said fixed ends within each subset are located a substantially equal distance from said shoulder, said distance of said fixed ends being different for each subset.

12. The bulkhead penetration system of claim 9, wherein said finger lengths within each subset generally vary.

13. The bulkhead penetration system of claim 9, wherein said locking fingers within each subset are substantially symmetrically located about said locking portion.

14. The bulkhead penetration system of claim 9, wherein said angles of said locking fingers within each subset are substantially equal, said angles being different for each subset.

15. The bulkhead penetration system of claim 1 further including a reinforcing rib disposed at an intersection of said shoulder with said locking portion.

16. The bulkhead penetration system of claim 1, further including a sealing grommet defining at least one cable aperture.

17. The bulkhead penetration system of claim 16, further including a boot defining a radial boot split and a boot bore extending along said longitudinal axis and dimensioned, at least in part, for surroundingly receiving a portion of said bulkhead member, such that said boot has a substantially C-shaped cross-section.

18. The bulkhead penetration system of claim 17, wherein said boot further includes a first sleeve portion integral with a second sleeve portion, said second sleeve portion having an interior recess for receiving said grommet.

19. The bulkhead penetration system of claim 18, wherein said bulkhead member further includes a collar portion integral with said shoulder, said first sleeve portion being sized for encompassing said collar portion.

20. The bulkhead penetration system of claim 17, wherein said boot further includes a first and a second sealing surface at said boot split extending parallel to said longitudinal axis.

21. The bulkhead penetration system of claim 20, wherein said first sealing surface includes a tongue for mating with a groove of said second sealing surface when said boot split is closed to join said first and second sealing surfaces.

22. The bulkhead penetration system of claim 18 further including a first and second fastener for applying force to close said boot split, said first fastener being positioned on said first sleeve portion, said second fastener being positioned on said second sleeve portion.

23. The bulkhead penetration system of claim 1, wherein said shoulder further includes a skirt portion extending from said shoulder parallel to said longitudinal axis, said skirt portion having a contacting edge generally orthogonal thereto.

24. The bulkhead penetration system of claim 23, wherein said wall is retained between at least one of said retaining ends and said contacting edge.

25. The bulkhead penetration system of claim 23, wherein a gasket is disposed between said skirt portion and said locking portion.

26. The bulkhead penetration system of claim 25, wherein said skirt portion includes a width, said gasket includes a thickness greater than said width of said skirt portion.

27. A bulkhead penetration system defined about a longitudinal axis for interlocking with a wall and feeding a cable through said wall, said system comprising:

a bulkhead member defining a bore therethrough, said bulkhead member having an outwardly extending shoulder disposed between a locking portion and a collar portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an original undeflected position, each of said locking fingers in said undeflected position defining an angle between said finger length and said longitudinal axis, said bulkhead member interlocking with said wall such that said wall is retained between at least one of said retaining ends and said shoulder;

a boot made of resilient material defining a boot split and a boot bore therethrough along said longitudinal axis such that said boot has a substantially C-shaped cross-section, said boot having a first sleeve portion integral with a second sleeve portion, said first sleeve portion being sized for encompassing said collar portion, said boot having a first and a second sealing surface at said boot split extending parallel to said longitudinal axis, said first sealing surface engaging said second sealing surface when said boot split is joined;

a sealing grommet defining at least one cable aperture, said grommet being sized and shaped to conform with an inner surface of said second sleeve portion.

28. The bulkhead penetration system of claim 27 further including a gasket disposed between said shoulder and said retaining ends for sealing engagement of said shoulder with said wall.

29. The bulkhead penetration system of claim 27 further including a first and a second fastener for applying force to close said boot split, said first fastener being positioned on said first sleeve portion, said second fastener being positioned on said second sleeve portion.

30. The bulkhead penetration system of claim 27, wherein said first sleeve portion includes a groove for receiving a retaining rib formed in said collar portion when said collar portion is inserted into said first sleeve portion of said boot bore.

31. The bulkhead penetration system of claim 29, wherein said first sleeve portion defines a first channel for positioning said first fastener, said second sleeve portion defining a second channel for positioning said second fastener.

32. The bulkhead penetration system of claim 27, wherein a step is disposed between said first sleeve portion and said second sleeve portion.

33. The bulkhead penetration system of claim 27, wherein a plurality of cable apertures are defined by said sealing grommet, and said cable apertures have substantially the same size and shape.

34. The bulkhead penetration system of claim 27, wherein said bore of said bulkhead member and said boot bore are substantially cylindrical.

35. The bulkhead penetration system of claim 27, wherein said second sleeve portion includes an interior recess for receiving said sealing grommet.

36. The bulkhead penetration system of claim 27, wherein said first sealing surface includes a tongue for mating with a groove of said second sealing surface when said boot split is joined.

37. The bulkhead penetration system of claim 27, wherein said grommet further defines at least one grommet split extending radially from said longitudinal axis and intersecting with said at least one cable aperture for allowing said cable to be inserted into said at least one cable aperture.

38. The bulkhead penetration system of claim 27, wherein said shoulder includes a skirt portion extending from said shoulder parallel to said longitudinal axis, said skirt portion having a contacting edge generally orthogonal thereto.

39. The bulkhead penetration system of claim 38, wherein said wall is retained between at least one of said retaining ends and said contacting edge.

40. The bulkhead penetration system of claim 38, further including a gasket disposed between said skirt portion and said locking portion, said skirt portion having a width, said gasket having a thickness greater than said width of said skirt portion.

41. The bulkhead penetration system of claim 27 further including a reinforcing rib disposed at an intersection of said shoulder with said locking portion.

42. A bulkhead penetration system defined about a longitudinal axis for interlocking with a wall and feeding a cable through said wall, said system comprising:
  a boot made of resilient material capable of flexing, said boot defining a radial boot split and a boot bore therethrough along said longitudinal axis such that said boot has an inner surface and a substantially C-shaped cross-section, said boot having a first sleeve portion integral with a second sleeve portion, said boot having a first and a second sealing surface extending parallel to said longitudinal axis at said boot split, said first sealing surface contacting and sealing with said second sealing surface when said boot split is joined.

43. The bulkhead penetration system of claim 42, wherein said system further includes a sealing grommet defining at least one cable aperture therein, said grommet being sized and shaped to substantially conform to said boot bore so that when said boot split is joined, said grommet sealingly engages said inner surface.

44. The bulkhead penetration system of claim 43, wherein said sealing grommet further defines at least one grommet split extending radially from said longitudinal axis and intersecting with said cable aperture for allowing a cable to be easily inserted into said cable aperture.

45. The bulkhead penetration system of claim 43, wherein said second sleeve portion includes an interior recess for receiving said sealing grommet.

46. The bulkhead penetration system of claim 42, further including a bulkhead member defining a bore therethrough, said bulkhead member having an outwardly extending shoulder disposed between a locking portion and a collar portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an original undeflected position, each of said locking fingers in said undeflected position defining an angle between said finger length and said longitudinal axis, said bulkhead member interlocking with said wall such that said wall is retained between at least one of said retaining ends and said shoulder.

47. The bulkhead penetration system of claim 46, wherein said first sleeve portion is sized for encompassing said collar portion.

48. The bulkhead penetration system of claim 42, wherein said first sealing surface includes a tongue for mating with a groove formed in said second sealing surface when said boot split is joined.

49. The bulkhead penetration system of claim 46 further including a gasket disposed between said shoulder and said retaining ends for the sealing engagement of said shoulder with said wall.

50. The bulkhead penetration system of claim 49 further including a first fastener for applying force to close said boot split, said first fastener being positioned on said first sleeve portion, a second fastener for applying force to close said boot split, said second fastener being positioned on said second sleeve portion.

51. The bulkhead penetration system of claim 46, wherein said shoulder includes a skirt portion extending from said shoulder parallel to said longitudinal axis, said skirt portion having a contacting edge generally orthogonal thereto.

52. The bulkhead penetration system of claim 51, wherein said wall is retained between at least one of said retaining ends and said contacting edge.

53. The bulkhead penetration system of claim 51 further including a gasket disposed between said skirt portion and said locking portion, said skirt portion having a width, said gasket having a thickness greater than said width of said skirt portion.

54. The bulkhead penetration system of claim 46 further including a reinforcing rib disposed at an intersection of said shoulder with said locking portion.

55. A method for penetrating a wall with a bulkhead penetration system for feeding a cable through said wall, said method comprising:
  passing said cable through a bore defined within a bulkhead member, said bulkhead member being formed about a longitudinal axis and having an outwardly extending shoulder disposed between a locking portion and a collar portion, said locking portion having a plurality of outwardly extending locking fingers, each of said locking fingers having a fixed end and a retaining end with a camming surface disposed therebetween, said retaining end being proximate to said shoulder relative to said fixed end, said locking fingers being capable of deflecting independently of each other and having an undeflected position;

providing a hole in said wall, said hole sized slightly larger than said bulkhead member such that said wall contacts at least one of said camming surfaces when said bulkhead member is pressed into said hole generally along said longitudinal axis and substantially perpendicular to said wall;

passing said cable through said hole;

pressing said bulkhead member into said hole generally along said longitudinal axis and substantially perpendicular to said wall such that said wall contacts at least one of said camming surfaces and such that said locking finger in contact with said wall deflects from said undeflected position;

locking said bulkhead member into position such that at least one of said locking fingers returns to a position such that said retaining end is raised relative to said fixed end to provide a detent for said wall such that said wall is retained between at least one of said retaining ends and said shoulder; and placing a gasket between said shoulder and said retaining ends such that said gasket is disposed between said shoulder and said wall after said bulkhead member is locked into position with said wall.

56. The method of claim 55, further including placing said cable into a cable aperture defined in a sealing grommet, said sealing grommet being adapted for being received within a boot bore defined within a boot.

57. The method of claim 56, wherein said boot further defines a radial boot split extending parallel to said longitudinal axis such that said boot has a inner surface and a substantially C-shaped cross-section, said boot having a first sleeve portion integral with a second sleeve portion, said first sleeve portion being sized for encompassing said collar portion, said method further including:

placing said sealing grommet into said boot bore;

inserting said collar portion into said boot bore such that said first sleeve portion encompasses said collar portion.

58. The method of claim 57, wherein said boot further includes a first and a second sealing surface extending parallel to said longitudinal axis at said boot split, said method further including:

placing a first fastener having a first tightening mechanism around said first sleeve portion such that said first tightening mechanism is positioned adjacent to said boot split;

placing a second fastener having a second tightening mechanism around said second sleeve portion such that said second tightening mechanism is positioned adjacent to said boot split;

tightening said first and second fasteners to provide closure of said boot split and engagement of said first and second sealing surfaces.

59. The method of claim 58, wherein said first sealing surface includes a tongue for mating with a groove formed in said second sealing surface when said boot split is joined.

60. The method of claim 55, wherein said plurality of locking fingers includes at least one subset of said locking fingers, each subset having at least two locking fingers wherein said retaining ends of said subset are located a substantially equal distance from said shoulder, said distance being different for each said subset, said method further including using said bulkhead member to interlock with walls having different thicknesses corresponding with said different distances.

61. The method of claim 55 further including, prior to said locking, flexing said shoulder about an intersection of said shoulder with said locking portion.

62. The method of claim 55, wherein said shoulder further includes a skirt portion extending from said shoulder parallel to said longitudinal axis, said skirt portion having a contacting edge generally orthogonal thereto, said method further including retaining said wall between at least one of said retaining ends and said contacting edge.

63. The method of claim 55 further including compressing said gasket.

64. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder integral with a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said plurality of locking fingers including at least two subsets of said locking fingers, each subset having at least two locking fingers wherein said retaining ends of said subset are located a substantially equal distance from said shoulder, said distance being different for each said subset, said bulkhead member interlocking said wall such that said wall is retained between said shoulder and said retaining ends of at least one said subset;

wherein said fixed ends of said locking fingers are substantially equidistant from said shoulder.

65. The bulkhead penetration system of claim 64, wherein said finger lengths within each subset generally vary.

66. The bulkhead penetration system of claim 64, wherein said locking fingers within each subset are substantially symmetrically located about said locking portion.

67. The bulkhead penetration system of claim 64, wherein said angles of said locking fingers within each subset are substantially equal, said angles being different for each subset.

68. The bulkhead penetration system of claim 64, further including a sealing grommet defining at least one cable aperture.

69. The bulkhead penetration system of claim 64, further including a boot defining a radial boot split and boot bore along said longitudinal axis and dimensioned, at least in part, for surroundingly receiving a portion of said bulkhead member, such that said boot has a substantially C-shaped cross-section.

70. The bulkhead penetration system of claim 69, further including a first and second fastener for applying force to close said boot split, said first fastener being positioned on said first sleeve portion, said second fastener being positioned on said second sleeve portion.

71. The bulkhead penetration system of claim 69, wherein said boot further includes a first sleeve portion integral with a second sleeve portion, said second sleeve portion having an interior recess for receiving a grommet.

72. The bulkhead penetration system of claim 71, wherein said boot further includes a first sleeve portion integral with a second sleeve portion, said second sleeve portion having an interior recess for receiving said grommet.

73. The bulkhead penetration system of claim 69, wherein said boot further includes a first and a second sealing surface at said boot split extending parallel to said longitudinal axis.

74. The bulkhead penetration system of claim 73, wherein said first sealing surface includes a tongue for mating with a groove of said second sealing surface when said boot split is joined.

75. The bulkhead penetration system of claim 64, further including a gasket disposed between said retaining ends and said shoulder for sealing engagement between said shoulder and said wall.

76. The bulkhead penetration system of claim 64, wherein said bore is substantially cylindrical.

77. The bulkhead penetration system of claim 64, wherein said shoulder includes a skirt portion extending from said shoulder parallel to said longitudinal axis, said skirt portion having a contacting edge generally orthogonal thereto.

78. The bulkhead penetration system of claim 77, wherein said wall is retained between at least one of said retaining ends and said contacting edge.

79. The bulkhead penetration system of claim 77 further including a gasket disposed between said skirt portion and said locking portion, said skirt portion having a width, said gasket having a thickness greater than said width of said skirt portion.

80. The bulkhead penetration system of claim 64 further including a reinforcing rib disposed at an intersection of said shoulder with said locking portion.

81. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary;

wherein said plurality of locking fingers includes at least two subsets of said locking fingers, each subset having at least two locking fingers wherein said retaining ends of each subset are located a substantially equal distance from said shoulder, said distance being different for each said subset; and wherein all of said fixed ends of said locking fingers are substantially equidistant from said shoulder.

82. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary;

wherein said plurality of locking fingers includes at least two subsets of said locking fingers, each subset having at least two locking fingers wherein said retaining ends of said subset are located a substantially equal distance from said shoulder, said distance being different for each said subset; and wherein all of said finger lengths within said subset generally vary.

83. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary;

wherein said plurality of locking fingers includes at least two subsets of said locking fingers, each subset having at least two locking fingers wherein said retaining ends of said subset are located a substantially equal distance from said shoulder, said distance being different for each said subset;

wherein all of said angles of said locking fingers within said subset are substantially equal, said angels being different for each subset.

84. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary;

a sealing grommet defining at least one cable aperture;

a boot defining a radial boot split and a boot bore extending along said longitudinal axis and dimensioned, at least in part, for surroundingly receiving a portion of said bulkhead member, such that said boot has a substantially C-shaped cross-section;

wherein said boot further includes a first sleeve portion integral with a second sleeve portion, said second sleeve portion having an interior recess for receiving said grommet;

and wherein said bulkhead member further includes a collar portion integral with said shoulder, said first sleeve portion being sized for encompassing said collar portion.

85. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary;

a sealing grommet defining at least one cable aperture;

a boot defining a radial boot split and a boot bore extending along said longitudinal axis and dimensioned, at least in part, for surroundingly receiving a portion of said bulkhead member, such that said boot has a substantially C-shaped cross-section;

wherein said boot further includes a first and a second sealing surface at said boot split extending parallel to said longitudinal axis; and wherein said first sealing surface includes a tongue for mating with a groove of said second sealing surface when said boot split is closed to join said first and second sealing surfaces.

86. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary;

a sealing grommet defining at least one cable aperture;

a boot defining a boot split and a boot bore extending radially along said longitudinal axis, such that said boot has a substantially C-shaped cross-section;

wherein said boot further includes a first sleeve portion integral with a second sleeve portion, said second sleeve portion having an interior recess for receiving said grommet; and a first and a second fastener for applying force to close said boot split, said first fastener being positioned on said first sleeve portion, said second fastener being positioned on said second sleeve portion.

87. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary;

further including a gasket disposed between said retaining ends and said shoulder for sealing engagement between said shoulder and said wall.

88. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder adjacent to a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said bulkhead member interlocking with said wall such that said wall is retained between at least one of said retaining ends and said shoulder wherein said finger lengths generally vary;

wherein said shoulder further includes a skirt portion extending from said shoulder along said longitudinal axis, said skirt portion having a contacting edge generally orthogonal thereto.

89. A method for penetrating a wall with a bulkhead penetration system for feeding a cable through said wall, said method comprising:

passing said cable through a bore defined within a bulkhead member, said bulkhead member being formed about a longitudinal axis and having an outwardly extending should disposed between a locking portion and a collar portion, said locking portion having a plurality of outwardly extending locking fingers, each of said locking fingers having a fixed end and a retaining end with a camming surface disposed therebetween, said retaining end being proximate to said shoulder relative to said fixed end, said locking fingers being capable of deflecting independently of each other and having an undeflected position;

providing a hole in said wall, said hole sized slightly larger than said bulkhead member such that said wall contacts at least one of said camming surfaces when said bulkhead member is pressed into said hole generally along said longitudinal axis and substantially perpendicular to said wall;

passing said cable through said hole;

pressing said bulkhead member into said hole generally along said longitudinal axis and substantially perpendicular to said wall such that said wall contacts at least one of said camming surfaces and such that said locking finger in contact with said wall deflects from said undeflected position;

locking said bulkhead member into position such that at least one of said locking fingers returns to a position such that said retaining end is raised relative to said fixed end to provide a detent for said wall is retained between at least one said retaining ends and said shoulder;

placing said cable into a cable aperture defined in a sealing grommet, said sealing grommet being adapted for being received within a boot bore defined within a boot;

wherein said boot further defines a radial boot split extending said longitudinal axis such that said boot has an inner surface and a substantially C-shaped cross-section, said boot having a first sleeve portion integral with a second sleeve portion, said first sleeve portion being sized for encompassing said collar portion, said method further including:

placing said sealing grommet into said boot bore;

inserting said collar portion into said boot bore such that said first sleeve portion encompasses said collar portion.

90. The method of claim 89, wherein said boot further includes a first and a second sealing surface extending parallel to said longitudinal axis at said boot split, said method further including:

placing a first fastener having a first tightening mechanism around said first sleeve portion such that said first tightening mechanism is positioned adjacent to said boot split;

placing a second fastener having a second tightening mechanism around said second sleeve potion such that said second tightening mechanism is positioned adjacent to said boot split; and tightening said first and second fasteners to provide closure of said boot split and engagement of said first and second sealing surfaces.

91. The method of claim 90, wherein said first sealing surface includes a tongue for mating with a groove formed in said second sealing surface when said boot split is joined.

92. A method for penetrating a wall with a bulkhead penetration system for feeding a cable through said wall, wherein said plurality of locking fingers includes at least two subsets of said locking fingers, each subset having at least two locking fingers wherein all of said retaining ends of said subset are located a substantially equal distance from said shoulder, said distance being different for each said subset, said method further including using said bulkhead member to interlock with walls having different thicknesses corresponding with said different distances.

93. A method for penetrating a wall with a bulkhead penetration system for feeding a cable through said wall, said method comprising:

passing said cable through a bore defined within a bulkhead member, said bulkhead member being formed about a longitudinal axis and having an outwardly extending shoulder disposed between a locking portion and a collar portion, said locking portion having a plurality of outwardly extending locking fingers, each of said locking fingers having a fixed end and a retaining end with a camming surface disposed therebetween, said retaining end being proximate to said shoulder relative to said fixed end, said locking fingers being capable of deflecting independently of each other and having an undeflected position;

providing a hole in said wall, said hole sized slightly larger than said bulkhead member such that said wall contacts at least one of said camming surfaces when said bulkhead member is pressed into said hole generally along said longitudinal axis and substantially perpendicular to said wall;

passing said cable through said hole;

pressing said bulkhead member into said hole generally along said longitudinal axis and substantially perpendicular to said wall such that said wall contacts at least one of said camming surfaces and such that said locking finger in contact with said wall deflects from said undeflected position;

locking said bulkhead member into position such that at least one of said locking fingers returns to a position such that said retaining end is raised relative to said fixed end to provide a detent for said wall such that said wall is retained between at least one of said retaining ends and said shoulder;

placing a gasket between said shoulder and said retaining ends such that said gasket is disposed between said shoulder and said wall after said bulkhead member is locked into position with said wall; and prior to said locking, flexing said shoulder about an intersection of said shoulder with said locking portion.

94. A method for penetrating a wall with a bulkhead penetration system for feeding a cable through said wall, said method comprising:

passing said cable through a bore defined within a bulkhead member, said bulkhead member being formed about a longitudinal axis and having an outwardly extending shoulder disposed between a locking portion and a collar portion, said locking portion having a plurality of outwardly extending locking fingers, each of said locking fingers having a fixed end and a retaining end with a camming surface disposed therebetween, said retaining end being proximate to said shoulder relative to said fixed end, said locking fingers being capable of deflecting independently of each other and having an undeflected position;

providing a hole in said wall, said hole sized slightly larger than said bulkhead member such that said wall contacts at least one of said camming surfaces when said bulkhead member is pressed into said hole generally along said longitudinal axis and substantially perpendicular to said wall;

passing said cable through said hole;

pressing said bulkhead member into said hole generally along said longitudinal axis and substantially perpendicular to said wall such that said wall contacts at least one of said camming surfaces and such that said locking finger in contact with said wall deflects from said undeflected position;

locking said bulkhead member into position such that at least one of said locking fingers returns to a position such that said retaining end is raised relative to said fixed end to provide a detent for said wall such that said wall is retained between at least one of said retaining ends and said shoulder;

placing a gasket between said shoulder and said retaining ends such that said gasket is disposed between said shoulder and said wall after said bulkhead member is locked into position with said wall; and wherein said shoulder further includes a skirt portion extending from said shoulder parallel to said longitudinal axis, said skirt portion having a contacting edge generally orthogonal thereto, said method further including retaining said wall between at least one of said retaining ends and said contacting edge.

95. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder integral with a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said plurality of locking fingers including at least two subsets of said locking fingers, each subset having at least two locking fingers wherein said retaining ends of said subset are located a substantially equal distance from said shoulder, said distance being different for each said subset, said bulkhead member interlocking said wall such that said wall is retained between said shoulder and said retaining ends of at least one said subset;

further including a boot defining a radial boot split and boot bore along said longitudinal axis and dimensioned, at least in part, for surroundingly receiving a portion of said bulkhead member, such that said boot has a substantially C-shaped cross-section; and further including a first and second fastener for applying force to close said boot split, said first fastener being positioned on said first sleeve portion, said second fastener being positioned on said second sleeve portion.

96. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder integral with a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said plurality of locking fingers including at least two subsets of said locking fingers, each subset having at least two locking fingers wherein said retaining ends of said subset are located a substantially equal distance from said shoulder, said distance being different for each said subset, said bulkhead member interlocking said wall such that said wall is retained between said shoulder and said retaining ends of at least one said subset;

further including a gasket disposed between said retaining ends and said shoulder for sealing engagement between said shoulder and said wall.

97. A bulkhead penetration system for interlocking with a wall to feed a cable therethrough, the system comprising:

a bulkhead member defining a bore therethrough and formed about a longitudinal axis passing through a center of said bore, said bulkhead member having an outwardly extending shoulder integral with a locking portion, said locking portion having a plurality of outwardly extending locking fingers, each of said locking fingers having a fixed end and a retaining end with a camming surface disposed therebetween, said retaining end being proximate to said shoulder relative to said fixed end, each of said locking fingers defining a finger length between said fixed end and said retaining end, said locking fingers being capable of deflecting independently of each other and having an undeflected position, each of said locking fingers in said undeflected position defining an angle between said finger length and said longitudinal axis, said plurality of locking fingers including at least two subsets of said locking fingers, each subset having at least two locking fingers wherein said retaining ends of said subset are located a substantially equal distance from said shoulder, said distance being different for each said subset, said bulkhead member interlocking said wall such that said wall is retained between said shoulder and said retaining ends of at least one said subset;

wherein said shoulder includes a skirt portion extending from said shoulder parallel to said longitudinal axis, said skirt portion having a contacting edge generally orthogonal thereto.

98. The bulkhead penetration system of claim 97, wherein said wall is retained between at least one of said retaining ends and said contacting edge.

99. The bulkhead penetration system of claim 97 further including a gasket disposed between said skirt portion and said locking portion, said skirt portion having a width, said gasket having a thickness greater than said width of said skirt portion.

* * * * *

UNITED STATES PATENT AND TRADEMARK OFFICE
CERTIFICATE OF CORRECTION

PATENT NO.   : 6,215,065 B1                                              Page 1 of 1
DATED        : April 10, 2001
INVENTOR(S)  : Albert R. Cox It is certified that error appears in the above-identified patent and that said Letters Patent is hereby corrected as shown below:

Column 13, claim 72,
Lines 5-8, delete "The bulkhead penetration system of claim 71, wherein said boot further includes a first sleeve portion integral with a second sleeve portion, said second sleeve portion having an interior recess for receiving said grommet." and insert:

-- The bulkhead penetration system of claim 71, wherein said bulkhead member further includes a collar portion adjacent to said shoulder, said first sleeve portion being sized for enclompassing said collar portion. --

Signed and Sealed this

Twentieth Day of November, 2001

Attest:

NICHOLAS P. GODICI
*Attesting Officer*     *Acting Director of the United States Patent and Trademark Office*